United States Patent [19]
Takamiya

[11] Patent Number: 6,034,761
[45] Date of Patent: Mar. 7, 2000

[54] DISPLACEMENT INFORMATION MEASURING APPARATUS

[75] Inventor: Makoto Takamiya, Tokyo, Japan

[73] Assignee: Canon Kabushika Kaisha, Tokyo, Japan

[21] Appl. No.: 09/021,955

[22] Filed: Feb. 11, 1998

[30] Foreign Application Priority Data

Feb. 13, 1997 [JP] Japan ................................. 9-044661

[51] Int. Cl.$^7$ .............................. G01P 3/36; G01B 9/02; G01B 11/02; G02F 1/00
[52] U.S. Cl. .................... 356/28.5; 356/349; 356/356; 359/256; 359/279; 359/323
[58] Field of Search ................. 356/28, 28.5, 358, 356/349, 356; 359/250, 256, 279, 322, 323

[56] References Cited

U.S. PATENT DOCUMENTS

| | | | |
|---|---|---|---|
| 5,383,048 | 1/1995 | Seaver ................................ | 359/279 |
| 5,483,332 | 1/1996 | Takamiya et al. .................... | 356/28.5 |
| 5,502,466 | 3/1996 | Kato et al. .......................... | 356/356 |
| 5,557,396 | 9/1996 | Ishizuka et al. .................... | 356/28.5 |
| 5,629,793 | 5/1997 | Takamiya et al. .................... | 359/278 |
| 5,640,239 | 6/1997 | Takamiya et al. .................... | 356/345 |
| 5,737,116 | 4/1998 | Kadowaki et al. ................... | 359/359 |
| 5,754,282 | 5/1998 | Kato et al. .......................... | 356/28.5 |
| 5,774,218 | 6/1998 | Takamiya et al. .................... | 356/356 |

FOREIGN PATENT DOCUMENTS

| | | |
|---|---|---|
| 2-262064 | 10/1990 | Japan . |
| 4-230885 | 8/1992 | Japan . |
| 8-15435 | 1/1996 | Japan . |

OTHER PUBLICATIONS

Foord, R., et al., "A Solid–State Electro–Optic Phase Modulator for Laser Doppler Anemometry", J. Phys. D: Appl. Phys., vol. 7, pp L36–L39 (1974).

Primary Examiner—Stephen C. Buczinski
Attorney, Agent, or Firm—Fitzpatrick, Cella, Harper & Scinto

[57] ABSTRACT

An apparatus for measuring displacement information of an object. The apparatus has a light source emitting a light beam, an electro-optical crystal member, a voltage applying system for imparting a predetermined frequency difference between light beams passing through two different areas in the electro-optical crystal member, and a light receiving system for receiving scattered light from the object to which the two light beams emergent from the electro-optical crystal member have been projected. The electro-optical crystal member is disposed so that a light beam from the light source may partly enter the two different areas to form the two light beams to which the predetermined frequency difference is imparted. The displacement information of the object is obtained from the scattered light received by the light receiving system.

18 Claims, 5 Drawing Sheets

DISPLACEMENT INFORMATION MEASURING APPARATUS

BACKGROUND OF THE INVENTION

1. Field of the Invention

This invention relates to a displacement information measuring apparatus, and particularly is suitable for measuring the displacement information of a moving object or fluid (hereinafter referred to as the "moving object") in non-contact by detecting the shift of the frequency of scattered light subjected to Doppler shift in conformity with the movement speed of the moving object.

2. Related Background Art

As an apparatus for measuring the displacement information of a moving object, in non-contact, and highly accurately, use has heretofore been made of a laser Doppler velocimeter and a laser encoder (an optical type displacement information measuring apparatus). In the laser Doppler velocimeter, the movement speed of a moving object is measured by the utilization of the effect of applying a laser beam to the moving object and the frequency of scattered light by the moving object shifting in proportion to the movement speed (Doppler effect).

Such laser Doppler velocimeters are proposed, for example, in Japanese Laid-Open Patent Application No. 2-262064, Japanese Laid-Open Patent Application No. 4-230885, Japanese Laid-Open Patent Application No. 8-15435, etc. In these velocimeters, the detection of the direction of movement of a moving object is not effected and there has been the tendency of detection becoming difficult when the speed of the moving object is approximate to 0.

In the laser Doppler velocimeter, a method of installing a frequency shifter using a flat plate of electro-optical crystal (hereinafter referred to as the "electro-optical element") in the optical path of two light beams, giving a predetermined frequency difference between the two light beams by the frequency shifter and causing the light beams to enter a moving object, thereby accurately detecting the direction of movement and movement speed of the moving object even when they are approximate to 0 has been published by Foord et al. (Appl. Phys., Vol. 7, 1974, pp. 136–139).

Figure 1:
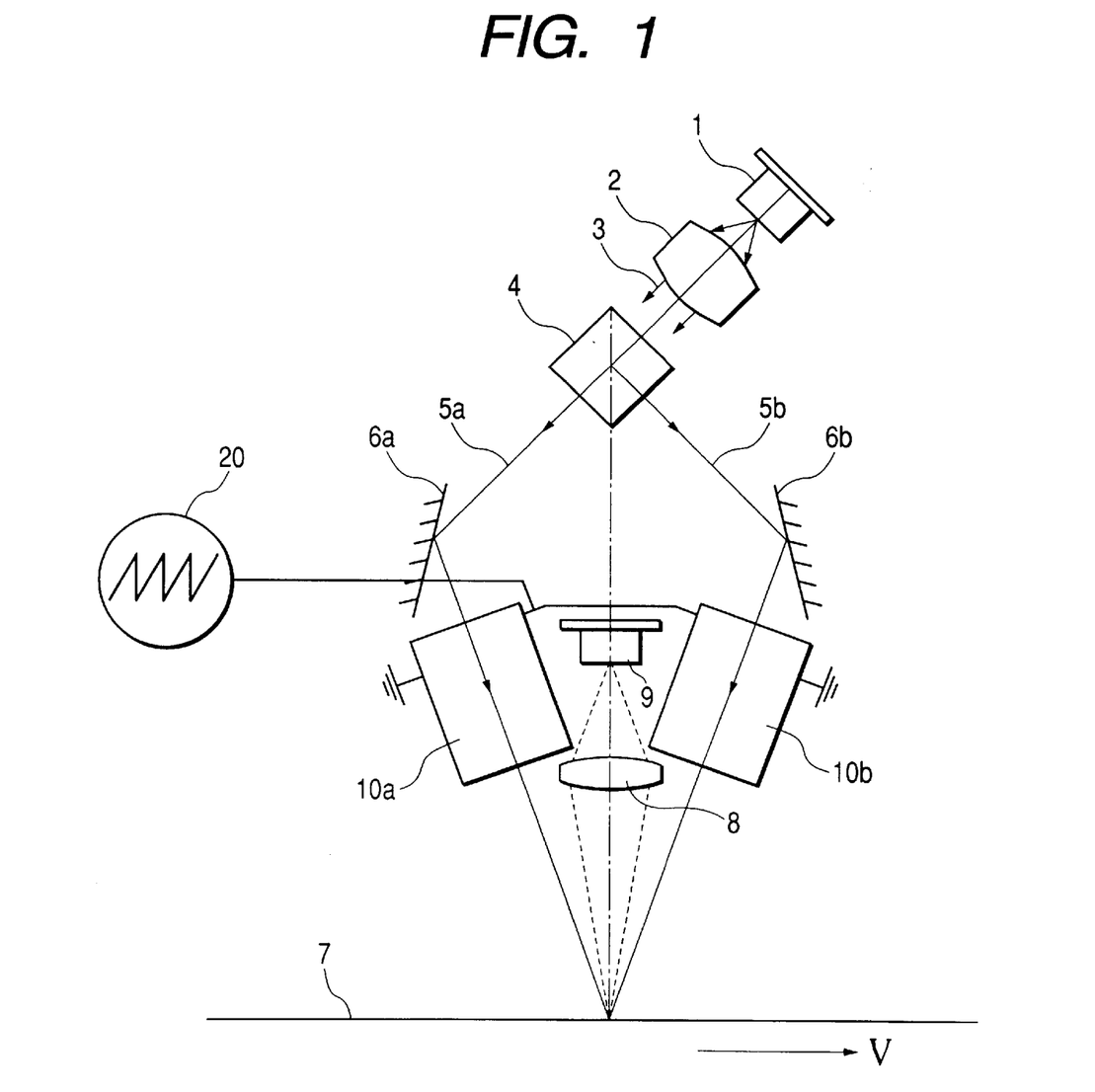
FIG. 1 is a schematic view of the essential portions of a Doppler velocimeter according to the prior art.

FIG. 1 of the accompanying drawings is a schematic view of the essential portions of a laser Doppler velocimeter utilizing the principle of detection described above. In FIG. 1, the reference numeral 10 designates a frequency shifter comprised of two electro-optical elements 10a, 10b and a driving circuit 20 therefor.

A light beam of a wavelength $\lambda$ from a light source 1 is made into parallel light 3 by a collimator lens 2, and the parallel light 3 is separated into two light beams 5a and 5b by a beam splitter 4, and the respective light beams are reflected by mirrors 6a and 6b and incident on the electro-optical elements 10a and 10b constituting the frequency shifter 10.

At this time, the light beams 5a and 5b are subjected to frequency shift by the sawteeth wave voltage driving (serodyne driving). Thereby a frequency difference is imparted between the two light beams 5a and 5b, and the two light beams are incident on the surface of a moving object 7 moving at a speed $V_0$ in the direction of arrow so as to intersect with each other. Of the light beams which have been incident, scattered light created from the moving object 7 is condensed by a condensing lens 8 and is directed to a photodetector 9, whereby a Doppler signal is obtained from the photo-detector 9.

At this time, the frequencies of the scattered lights by the two light beams are subjected to Doppler shift in proportion to the movement speed $V_0$ and interfere with each other on the detecting surface of the photodetector to thereby bring about a change of lightness and darkness. The frequency of the lightness and darkness at this time, i.e., Doppler frequency F, is as follows by the frequency difference fR between the two light beams:

$$F = 2 \cdot V_0 \cdot \sin(\theta)/\lambda + f_R \qquad (1)$$

Thus, even when the speed $V_0$ of the moving object 7 is low, for example, approximate to 0, it can be measured by setting the frequency difference $f_R$ with a suitable value, and the direction of speed can also be measured at the same time. This construction is a form utilized chiefly as a current meter.

Generally, when a light beam of high coherency such as a laser is applied to an object, scattered light created by the minute unevenness of the surface of the object is subjected to random phase modulation and forms a spot pattern, i.e., a so-called speckle pattern, on an observation surface. In a laser Doppler velocimeter, when a moving object moves, a change of lightness and darkness by the Doppler shift on the detecting surface of a photodetector for the detection of scattered light is modulated by an irregular change in lightness and darkness by the flow of the speckle pattern, and an output signal from the photodetector is modulated also by a change in the transmittance (or the reflectance) of the object to be examined.

Generally, in the laser Doppler velocimeter, the frequency of the change in lightness and darkness by the speckle pattern and the frequency of the change in the transmittance (or the reflectance) of the moving object are low as compared with Doppler frequency. Therefore, use is made of a method of passing the output from the photodetector through a high-pass filter to thereby electrically eliminate a low frequency component and take out only a Doppler signal.

However, when the speed of the moving object is low and the Doppler frequency becomes low, the frequency difference between it and a low frequency fluctuation component becomes small and there arises the problem that a high-pass filter cannot be used and it is difficult to measure the displacement information of the moving object with good accuracy. Further, the direction of speed cannot be detected in principle.

In contrast, the aforedescribed method (frequency shifter) published by Foord et al. attaches a predetermined frequency difference to two light beams before the two light beams are applied to the moving object, and makes the measurement of the moving object including the stationary state and the direction of speed thereof possible.

However, in a velocimeter utilizing the frequency shifter, the measurement of the moving object including the stationary state and the direction of speed becomes possible, while the optical system thereof becomes complicated and this has led to the tendency toward the bulkiness of the entire apparatus.

SUMMARY OF THE INVENTION

It is an object of the present invention to provide a displacement information measuring apparatus which is generally simplified by appropriately setting the construction of electro-optical crystal constituting a frequency shifter and yet gives a predetermined frequency difference (frequency modulation) between two light beams and can thereby detect the speed information of a moving object highly accurately by the utilization of Doppler effect.

Other objects of the present invention will become apparent from the following description of some embodiments of the invention.

DESCRIPTION OF THE PREFERRED EMBODIMENTS

Figure 2A:
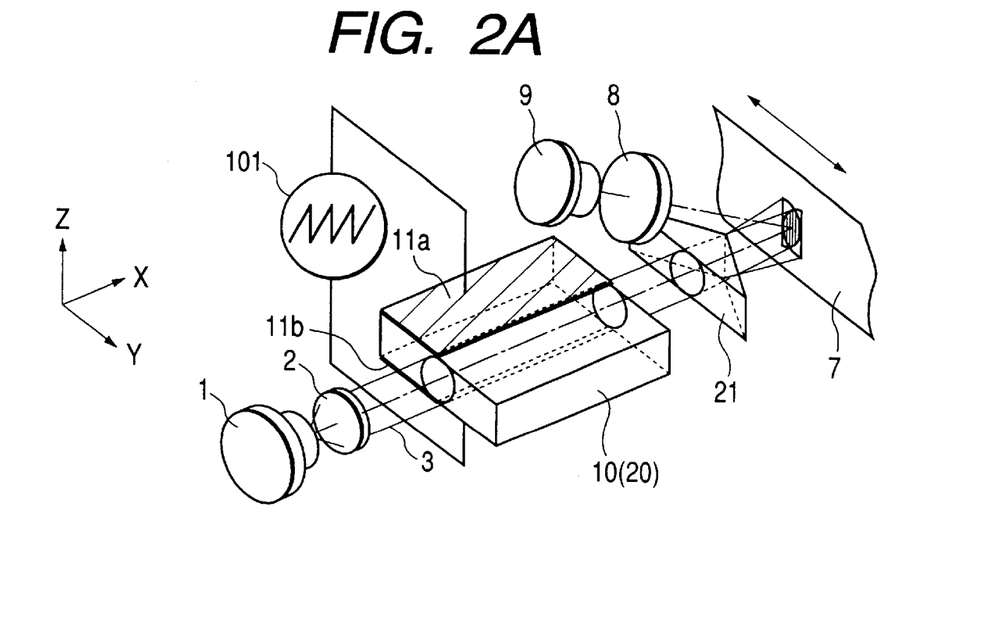
FIG. 2A is a schematic view of the essential portions of Embodiment 1 of the present invention.
Figure 2B:
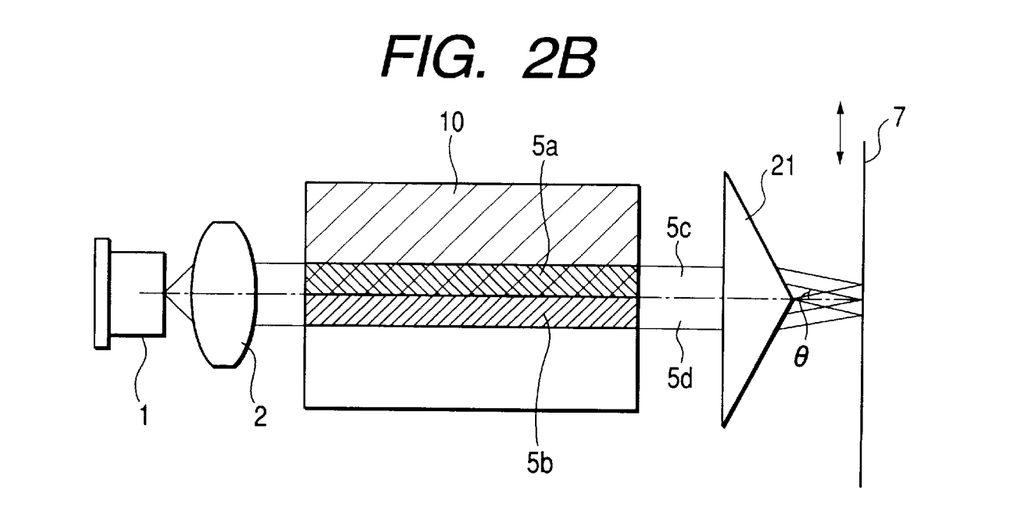
FIG. 2B is a cross-sectional view taken along the line XY of FIG. 2A.

FIG. 2A is a schematic view of the essential portions of Embodiment 1 of the present invention. FIG. 2B is a cross-sectional view taken along the line XY of FIG. 2A. In FIGS. 2A and 2B, the reference numeral 1 designates a laser diode as light source means, which is disposed in the direction of Z-axis of coordinates shown in FIG. 2A so that a laser beam projected therefrom may become linearly polarized light. The light beam from the laser diode 1 is incident on a collimator lens 2, whereby the light beam is made into a parallel light beam 3 and emitted.

The parallel light beam 3 which has been emitted from the collimator lens 2 intactly is incident on a frequency shifter 20 comprising electro-optical crystal (an electro-optical element) 10 having C-axis (optical axis) on the Z-axis.

As the electro-optical crystal 10, use is made, for example, of $LiNbO_3$ which is uniaxial crystal. The reference characters 11a and 11b denote electrodes provided on the electro-optical crystal 10. The electrodes 11a and 11b are adapted to apply an electric field to only the light beam portion 5a of the transmitting portion of the electro-optical crystal 10 by a driving circuit 101. The electro-optical crystal 10 has a thickness d=1 mm and a length L=20 mm, and when the wavelength λ of the laser beam is λ=780 nm and abnormal light refractive index $N_e$=2.2 and Pockels constant r=32.2×10$^{-9}$ (mm/V), the voltage is V=227.5 V and the phase difference of the laser beam after transmitted through the electro-optical crystal 10 is 2π.

In the present embodiment, the voltage amplitude is V=227.5 V and the electro-optical crystal 10 is serodyne-driven at a frequency $f_R$ to thereby form two areas 5a and 5b in which two light beams 5c and 5d having a frequency difference $f_R$ therebetween are obtained on the end portion of the electro-optical crystal 10. The light beams 5c and 5d having the frequency difference $f_R$ therebetween which have been outgone from the electro-optical crystal 10 are incident on a prism 21 as deflecting means, and are applied to an object to be measured (object) 7 moving at a speed V, at an angle of incidence θ from two directions.

The scattered light by the object 7 is detected by a photodetector 9 through a condensing lens 8. Doppler frequency F obtained in the photodetector 9 at that time is as follows, like expression (1), by the frequency difference $f_R$ between the two light beams 5c and 5d.

$$F=2\cdot V\cdot\sin(\theta)/\lambda+f_R \qquad (2)$$

Figure 3:
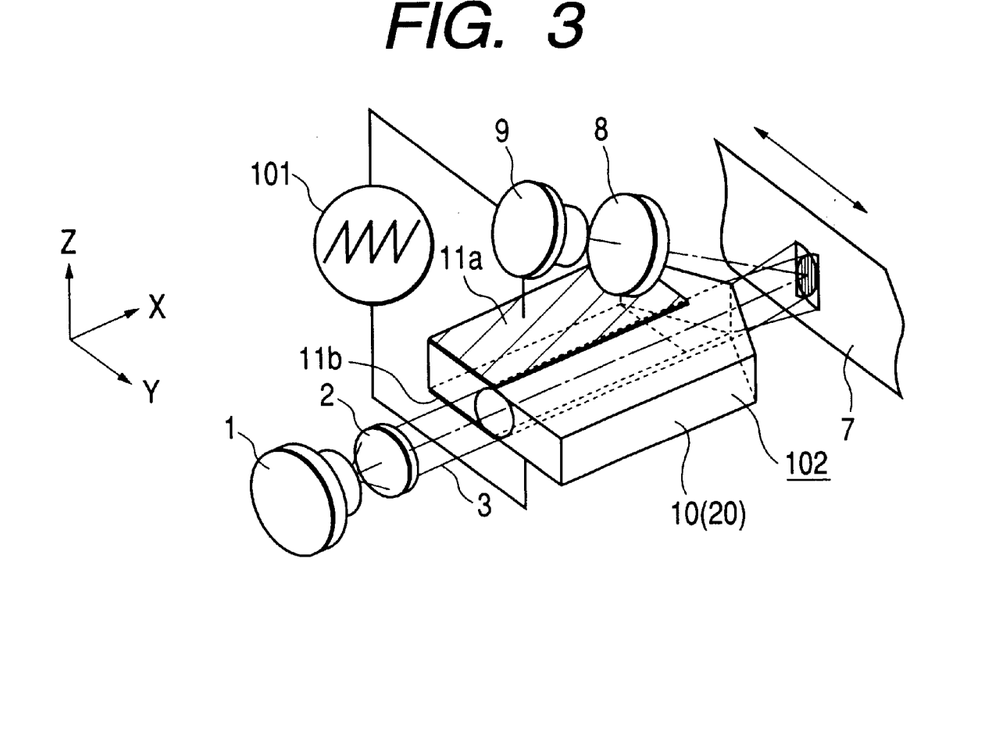
FIG. 3 is a schematic view of the essential portions of Embodiment 2 of the present invention.

FIG. 3 is a schematic view of the essential portions of Embodiment 2 of the present invention. This embodiment differs from Embodiment 1 of FIG. 2A only in that a member 102 comprising electro-optical crystal 10 and a prism 21 as deflecting means constructed integrally with each other, is used to simplify the entire apparatus, and in the other points, the construction of the present embodiment is the same as that of Embodiment 1.

Figure 4:
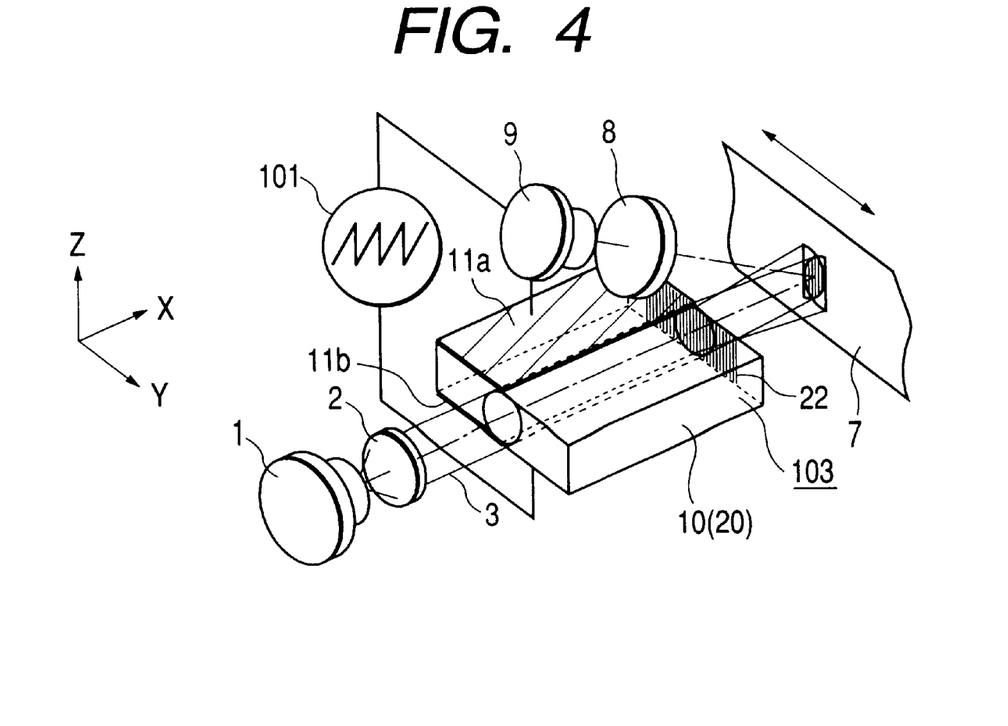
FIG. 4 is a schematic view of the essential portions of Embodiment 3 of the present invention.

FIG. 4 is a schematic view of the essential portions of Embodiment 3 of the present invention. This embodiment differs from Embodiment 1 of FIG. 2A only in that a brazed type diffraction grating 22 as deflecting means is used instead of the prism 21 and a member 103 in which this brazed type diffraction grating 22 is constructed integrally with the emergence portion of the electro-optical crystal 10 is used to simplify the entire apparatus, and in the other points, the construction of the present embodiment is the same as that of Embodiment 1. The brazed type diffraction grating 22 deflects the two light beams 5c and 5d having the frequency difference $f_R$ therebetween from the electro-optical crystal 10 and causes it to enter the object to be measured 7 at an angle of incidence θ.

In the present embodiment, when the pitch of the diffraction grating 22 is p, the angle of diffraction θ is $$p\cdot\sin(\theta)=\lambda \qquad (3).$$

Since the angle of diffraction θ at this time is equal to the angle of incidence θ onto the object to be measured 7, Doppler frequency is $$F=2\cdot V/P+f_R \qquad (4).$$

In this case, Doppler frequency F does not depend on the wavelength λ of the laser beam, and even if for example, the wavelength of the laser is varied by temperature or the like, stable Doppler frequency can be detected.

Figure 5:
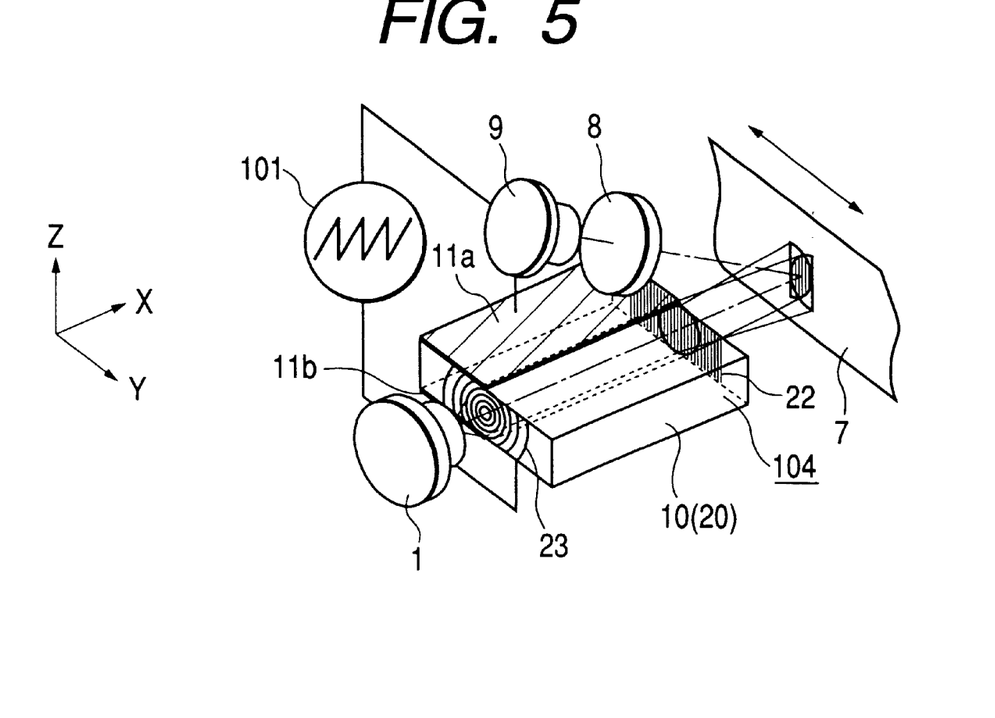
FIG. 5 is a schematic view of the essential portions of Embodiment 4 of the present invention.

FIG. 5 is a schematic view of the essential portions of Embodiment 4 of the present invention. This embodiment differs from Embodiment 3 of FIG. 4 only in that a Fresnel lens 23 is used instead of the collimator lens 2 and a member 104 in which this Fresnel lens 23 is constructed integrally with the incidence end portion of the electro-optical crystal 10 is used to simplify the entire apparatus, and in the other points, the construction of the present embodiment is the same as that of Embodiment 3.

In the present embodiment, the Fresnel lens 23 is integrally constructed on the incidence side end portion of the electro-optical crystal 10 and the brazed type diffraction grating 22 is integrally constructed on the outgoing side end portion of the electro-optical crystal 10, and the incidence of the optical system onto the object to be measured 7 comprises only one part and a highly accurate and highly stable displacement information measuring apparatus is realized by a very simple construction.

Figure 6:
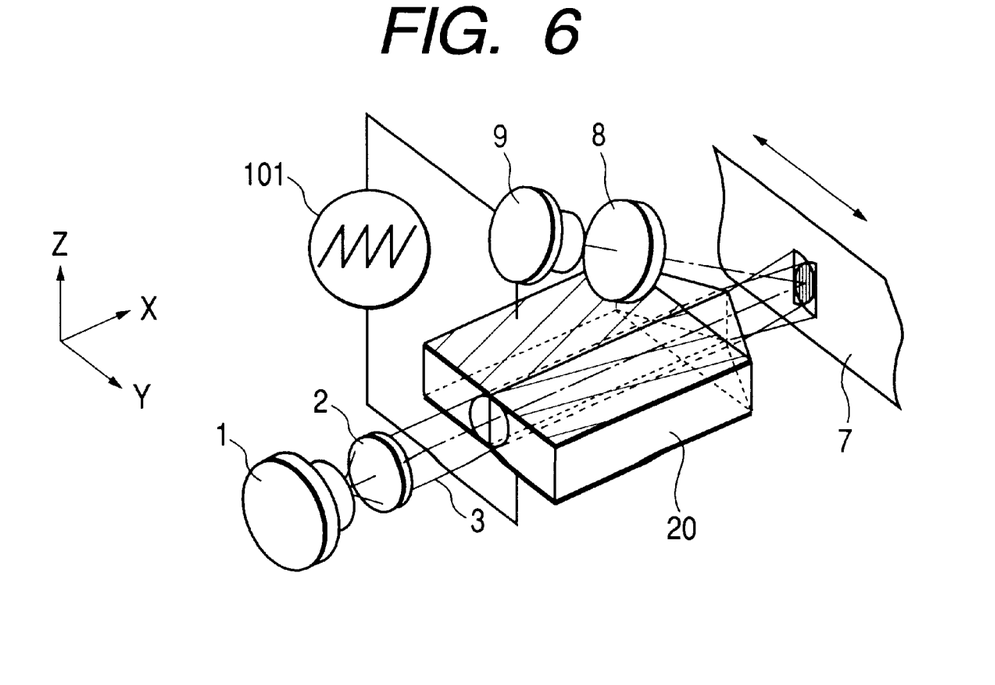
FIG. 6 is a schematic view of the essential portions of Embodiment 5 of the present invention.
Figure 7A:
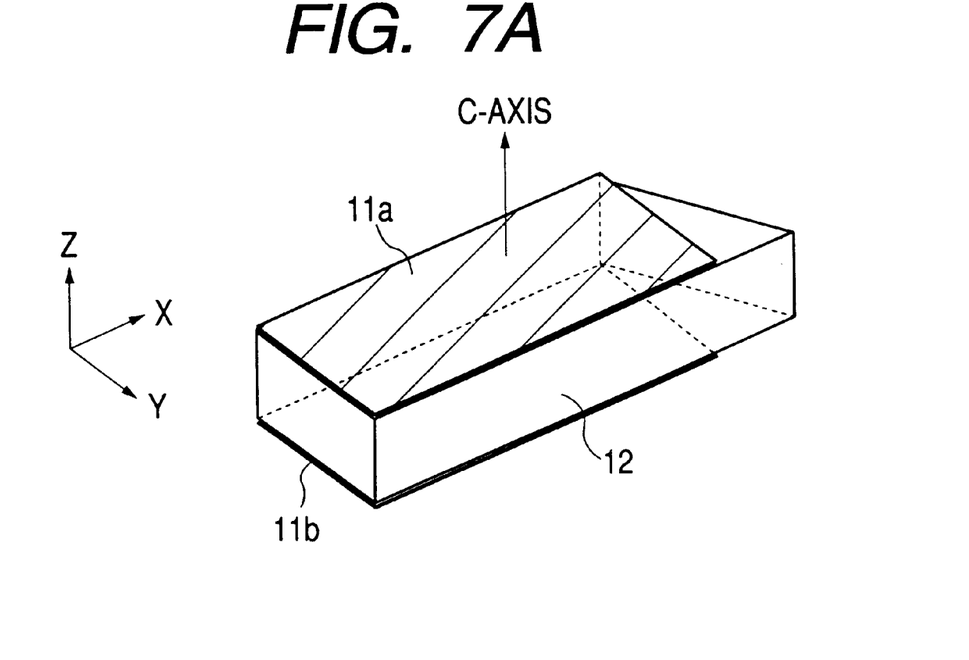
FIGS. 7A and 7B are illustrations of a portion of FIG. 6.
Figure 7B:
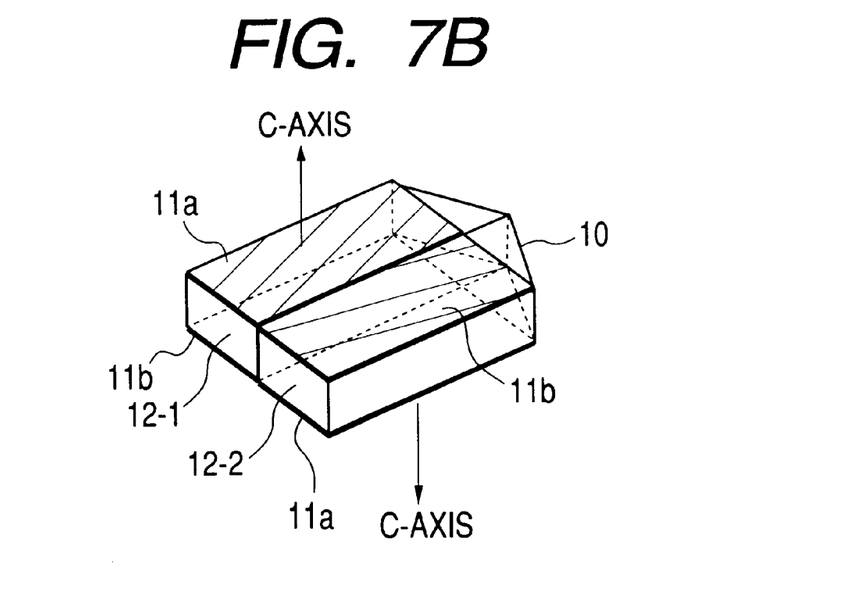

FIG. 6 is a schematic view of the essential portions of Embodiment 5 of the present invention, and FIGS. 7A and 7B are illustrations of the electro-optical crystal of FIG. 6. The basic construction of this embodiment is the same as that of Embodiment 2 of FIG. 3.

A frequency shifter 20 in the present embodiment is comprised of two electro-optical elements 12 (12-1 and 12-2) symmetrically disposed as shown in FIG. 7B.

As shown in FIG. 7B, an electrode 11*a* is provided on the upper surface of one electro-optical element 1-21 and an electrode 11*a* is provided on the lower surface of the other electro-optical element 12-2. Also, an electrode 11*b* is provided on the lower surface of one electro-optical element 12-1, and an electrode 11*b* is provided on the upper surface of the other electro-optical element 12-2. Here, the electrodes arranged at the same side are adapted to always assume equal potential. That is, voltages of opposite signs equal in absolute value to each other are applied to the electro-optical elements 12-1 and 12-2 with regard to C-axis.

When voltages are applied to the electrodes 11*a* and 11*b* on the upper surfaces of the electro-optical elements 12-1 and 12-2 and the electrodes 11*b* and 11*a* on the lower surfaces of the electro-optical elements 12-1 and 12-2 at a time, the voltage at which the phase difference between the light beams after transmission therethrough becomes $2\pi$ is ½ of that in Embodiment 1, i.e., V=113.75 V.

Also, the electro-optical elements 12 of the same simple shape are simply disposed in opposed relationship with each other and therefore, there is formed a frequency shifter 20 which is simple in construction and working.

While in the present embodiment, integral prism type electro-optical elements have been shown as the electro-optical crystal materials 12 opposed to each other, a similar effect can be obtained even if the electro-optical crystal 10 shown in Embodiments 3 and 4 is constructed of electro-optical crystal materials opposed to each other.

In the above-described embodiments, $LiNbO_3$ which is uniaxial crystal has been shown as the electro-optical crystal, but alternatively, ADP or $LiTaO_3$ may be used.

According to each embodiment, as described above, there can be achieved a displacement information measuring apparatus which is generally simplified by appropriately setting the construction of electro-optical crystal constituting a frequency shifter and yet gives a predetermined frequency difference (frequency modulation) between two light beams and can thereby detect the speed information of a moving object highly accurately by the utilization of Doppler effect.

What is claimed is:

1. An apparatus for measuring displacement information of an object, said apparatus comprising:

a light source emitting a light beam;

an electro-optical crystal member comprising two different areas, said electro-optical crystal member being disposed so that the light beam from said light source partly enters each of said two different areas to form two light beams, and projecting the two different light beams onto the object;

a voltage applying system for imparting a predetermined frequency difference between the light beams passing through said two different areas in said electro-optical crystal member; and a light receiving system for receiving scattered light from the object to which the two light beams, to which the predetermined frequency difference has been imparted, have been projected, the displacement information of the object being obtained from the scattered light received by said light receiving system.

2. An apparatus according to claim 1, further comprising a collimator lens for causing the light beam from said light source to be incident on said electro-optical crystal member as a parallel light beam.

3. An apparatus according to claim 1, further comprising a Fresnel lens integrally provided on the incidence end surface of said electro-optical crystal member so as to introduce the light beam from said light source into said electro-optical crystal member.

4. An apparatus according to claim 1, further comprising a light deflecting member for deflecting the two light beams outgoing from said electro-optical crystal member to which the predetermined frequency difference has been imparted.

5. An apparatus according to claim 4, wherein said light deflecting member has a prism or a diffraction grating.

6. An apparatus according to claim 4, wherein said light deflecting member is integrally provided on the emergence end surface of said electro-optical crystal member.

7. An apparatus according to claim 1, wherein said electro-optical crystal member is comprised of a single crystal material.

8. An apparatus according to claim 1, wherein said electro-optical crystal member comprises two crystal materials disposed in an opposed relationship with each other so that their crystal axes and shapes thereof may be symmetrical.

9. An apparatus for generating two light beams to which a predetermined frequency difference has been imparted, said apparatus comprising:

an electro-optical crystal member comprising two different areas, said electro-optical crystal system being disposed so that a light beam may partly be incident on said two different areas to form two different light beams; and a voltage applying system for imparting the predetermined frequency difference between the light beams passing through said two different areas in said electro-optical crystal member.

10. An apparatus according to claim 9, further comprising a Fresnel lens integrally provided on the incidence end surface of said electro-optical crystal member to generate a light beam into said electro-optical crystal member.

11. An apparatus according to claim 9, further comprising a light deflecting member integrally provided on an outgoing end surface of said electro-optical crystal member.

12. An apparatus according to claim 11, wherein said light deflecting member deflects the two different light beams so as to intersect with each other.

13. An apparatus for measuring displacement information of an object, said apparatus comprising:

light beam generating means generating a light beam;

frequency difference imparting means comprising an electro-optical crystal member having two different areas and being disposed so that a light beam from said light beam generating means may partly be incident on the two different areas to form two different light beams, said frequency difference imparting means imparting a predetermined frequency difference between the light beams passing through the two different areas in said electro-optical crystal member and projecting the light beams onto the object; and detecting means for receiving scattered light from the object to which the two light beams, to which the predetermined frequency difference has been imparted, have been projected, and obtaining the displacement information of the object.

14. An apparatus according to claim 13, further comprising a light deflecting member for deflecting the two light beams emerging from said electro-optical crystal member to which the predetermined frequency difference has been imparted.

15. An apparatus according to claim 14, wherein said light deflecting member has a prism or a diffraction grating.

16. An apparatus according to claim 14, wherein said light deflecting member is integrally provided on an outgoing end surface of said electro-optical crystal member.

17. An apparatus according to claim 13, wherein said electro-optical crystal member is comprised of a single crystal material.

18. An apparatus according to claim 13, wherein said electro-optical crystal member comprises two crystal materials disposed in an opposed relationship with each other so that their crystal axes and shapes thereof may be symmetrical.

* * * * *

UNITED STATES PATENT AND TRADEMARK OFFICE
CERTIFICATE OF CORRECTION

PATENT NO.   :  6,034,761
DATED        :  March 7, 2000
INVENTOR(S)  :  MAKOTO TAKAMIYA It is certified that error appears in the above-identified patent and that said Letters Patent is hereby corrected as shown below:

ON THE COVER PAGE
[73] Assignee "Canon Kabushika Kaisha" should read --Canon Kabushiki Kaisha--.

COLUMN 2
Line 7, "fR" should read --$f_R$--

COLUMN 4
Line 39, "if for" should read --if, for--.

Signed and Sealed this

Fifteenth Day of May, 2001

Attest:

NICHOLAS P. GODICI

Attesting Officer    Acting Director of the United States Patent and Trademark Office